United States Patent
Prohel et al.

(10) Patent No.: US 7,614,081 B2
(45) Date of Patent: Nov. 3, 2009

(54) MANAGING AND SHARING IDENTITIES ON A NETWORK

(75) Inventors: Andrew M. Prohel, San Francisco, CA (US); Philip McKay, San Francisco, CA (US); Himgan Wibisono, San Francisco, CA (US); Michael Hoch, San Jose, CA (US); Jeff Liu, Fremont, CA (US); Ravi Gauba, Fremont, CA (US); Sidney Wang, Pleasanton, CA (US); Ippei Tambata, San Francisco, CA (US); Elizabeth Coppinger, Montclair, NJ (US); Michael S. Harwayne, New York, NY (US); Rodger Lea, Vancouver (CA)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 341 days.

(21) Appl. No.: 10/407,675

(22) Filed: Apr. 4, 2003

(65) Prior Publication Data

US 2004/0002920 A1 Jan. 1, 2004

Related U.S. Application Data

(60) Provisional application No. 60/371,184, filed on Apr. 8, 2002.

(51) Int. Cl.
*G06F 7/04* (2006.01)
(52) U.S. Cl. .................... 726/18; 713/171; 709/223; 709/224; 709/225; 709/226; 726/3; 726/5

(58) Field of Classification Search ................. 705/1, 705/76; 726/2, 5, 3, 18; 707/4, 10, 6; 709/203, 709/229, 213, 201, 219, 206, 214, 223–226; 380/277, 273; 713/193, 171, 219
See application file for complete search history.

(56) References Cited

U.S. PATENT DOCUMENTS

| | | | |
|---|---|---|---|
| 5,796,393 A | | 8/1998 | MacNaughton et al. |
| 5,799,318 A | | 8/1998 | Cardinal et al. |
| 5,913,032 A | * | 6/1999 | Schwartz et al. ............ 709/213 |

(Continued)

FOREIGN PATENT DOCUMENTS

DE 19929188 A1 11/2001

(Continued)

OTHER PUBLICATIONS

Chu, et al., "MusicSummary Using Key Phrases", Cambridge Research Laboratory, Technical Report Series, Apr. 2000, pp. 1-11.

(Continued)

*Primary Examiner*—Thanhnga B Truong
(74) *Attorney, Agent, or Firm*—Blakely, Sokoloff, Taylor & Zafman LLP

(57) ABSTRACT

A digital content file having user history information is received at a first device. The user history information includes an alias name of a previous user of the digital content file. A user may review the user history information of the digital content file for information of the previous user of the digital content.

33 Claims, 7 Drawing Sheets

U.S. PATENT DOCUMENTS

| | | | |
|---|---|---|---|
| 5,940,830 A * | 8/1999 | Ochitani | 707/10 |
| 5,983,214 A | 11/1999 | Lang et al. | |
| 6,029,195 A | 2/2000 | Herz | |
| 6,112,181 A | 8/2000 | Shear et al. | |
| 6,176,425 B1 | 1/2001 | Harrison et al. | |
| 6,205,478 B1 | 3/2001 | Sugano et al. | |
| 6,226,618 B1 | 5/2001 | Downs et al. | |
| 6,249,226 B1 | 6/2001 | Harrison et al. | |
| 6,249,282 B1 | 6/2001 | Sutcliffe et al. | |
| 6,279,000 B1 * | 8/2001 | Suda et al. | 707/10 |
| 6,342,830 B1 | 1/2002 | Want et al. | |
| 6,438,579 B1 | 8/2002 | Hosken | |
| 6,446,208 B1 | 9/2002 | Gujar et al. | |
| 6,480,961 B2 | 11/2002 | Rajasekharan et al. | |
| 6,490,579 B1 | 12/2002 | Gao et al. | |
| 6,504,920 B1 | 1/2003 | Okon et al. | |
| 6,519,629 B2 | 2/2003 | Harvey et al. | |
| 6,523,022 B1 | 2/2003 | Hobbs | |
| 6,678,680 B1 | 1/2004 | Woo | |
| 6,728,729 B1 | 4/2004 | Jawa et al. | |
| 6,742,032 B1 | 5/2004 | Castellani et al. | |
| 6,757,710 B2 * | 6/2004 | Reed | 709/203 |
| 6,865,599 B2 | 3/2005 | Zhang | |
| 6,944,669 B1 * | 9/2005 | Saccocio | 709/229 |
| 6,947,966 B1 | 9/2005 | Oko et al. | |
| 6,957,199 B1 | 10/2005 | Fischer | |
| 6,961,723 B2 | 11/2005 | Faybishenko et al. | |
| 6,968,333 B2 | 11/2005 | Abbott et al. | |
| 7,010,537 B2 | 3/2006 | Eyal et al. | |
| 7,092,952 B1 | 8/2006 | Wilens | |
| 7,117,245 B1 * | 10/2006 | Levkoff et al. | 709/206 |
| 7,130,807 B1 | 10/2006 | Mikurak | |
| 7,162,488 B2 | 1/2007 | DeVorchik et al. | |
| 2001/0039656 A1 | 11/2001 | Nakamura et al. | |
| 2001/0051996 A1 | 12/2001 | Cooper | |
| 2002/0002483 A1 | 1/2002 | Siegel et al. | |
| 2002/0027567 A1 | 3/2002 | Niamir | |
| 2002/0055919 A1 | 5/2002 | Mikheev | |
| 2002/0062290 A1 | 5/2002 | Ricci | |
| 2002/0077988 A1 | 6/2002 | Sasaki et al. | |
| 2002/0091642 A1 | 7/2002 | Rahnasto | |
| 2002/0107701 A1 | 8/2002 | Batty et al. | |
| 2002/0138744 A1 | 9/2002 | Schleicher et al. | |
| 2002/0147880 A1 | 10/2002 | Wang Baldonado | |
| 2002/0156917 A1 | 10/2002 | Nye | |
| 2003/0009570 A1 | 1/2003 | Moskowitz et al. | |
| 2003/0028610 A1 | 2/2003 | Pearson | |
| 2003/0028889 A1 | 2/2003 | McCoskey et al. | |
| 2003/0037097 A1 | 2/2003 | Meyer et al. | |
| 2003/0037157 A1 | 2/2003 | Pestoni et al. | |
| 2003/0041108 A1 | 2/2003 | Henrick et al. | |
| 2003/0046281 A1 * | 3/2003 | Son | 707/6 |
| 2003/0050927 A1 | 3/2003 | Hussam | |
| 2003/0115318 A1 | 6/2003 | Wueste | |
| 2003/0121008 A1 | 6/2003 | Tischer | |
| 2003/0126245 A1 | 7/2003 | Feltin et al. | |
| 2003/0158958 A1 | 8/2003 | Chiu | |
| 2004/0030741 A1 | 2/2004 | Wolton et al. | |
| 2004/0039707 A9 | 2/2004 | Ricci | |
| 2005/0113066 A1 | 5/2005 | Hamberg | |
| 2005/0266835 A1 | 12/2005 | Agrawal et al. | |
| 2007/0106780 A1 | 5/2007 | Farnham et al. | |

FOREIGN PATENT DOCUMENTS

| | | |
|---|---|---|
| EP | 0993163 A1 | 12/2000 |
| EP | 1154390 A2 | 11/2001 |
| GB | 2367916 A | 4/2002 |
| WO | WO 01/01239 A2 | 1/2001 |
| WO | WO 01/06398 A2 | 1/2001 |
| WO | WO 01/46843 A2 | 6/2001 |
| WO | WO 01/61508 A1 | 8/2001 |
| WO | WO 01/75640 A2 | 10/2001 |

OTHER PUBLICATIONS

Maria Papadopouli, Henning Schulzrinne, "Design and Implementation Of A Peer-To-Peer Data Dissemination and Prefetching Tool for Mobile Users", Department of Computer Science, Comlumbia University, Mar. 2001, New York, NY.

"The Gnutella Protocol Specification", Aug. 19, 2000.

Gerd Kortuem, Zary Segall, Thaddeus G. Cowan Thompason, "Close Encounters: Supporting Mobile Collaboration through Interchange of User Profiles", Proceedings First International Symposium On Handheld And Ubiquitous Computing (HUC99), 1999, Karlsruhe, Germany & Lecture Notes In Computer Science vol. 1707, 1999, pp. 1-15.

Supplementary European Search Report for No. EP 03 71 8281 dated Dec. 15, 2008, 4 pgs.

Nichols M. David, et al., "Recommendation and Usage in the Digital Library", Internet Citation, 1997, XP002279577, URL:ftp://ftp.comp.lancs.ac.uk/pub/reports/1997/CSEG.2.97.pdf.

* cited by examiner

MANAGING AND SHARING IDENTITIES ON A NETWORK

RELATED APPLICATIONS

This application claims the benefit of U.S. Provisional Application No. 60/371,184, filed Apr. 8, 2002, incorporated herein by reference.

FIELD OF THE INVENTION

This invention relates generally to network devices, and more particularly to the distribution of digital content having user history information between the network devices.

COPYRIGHT NOTICE/PERMISSION

A portion of the disclosure of this patent document contains material, which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2002, Sony Electronics, Inc., All Rights Reserved.

BACKGROUND OF THE INVENTION

The Internet has created the ability for many new types of virtual communities. Online communities exist for all sorts of reasons, including; product reviews, shared interests, socialization and the selling or auctioning of goods and services, to name a few. These services are currently centralized, server-based services. Being centralized (e.g., hosted on a single server or group of servers) makes it easy for the service to poll the activity level and generate reports or displays of the current community status and activity.

The Internet also facilitates the direct exchange of digital content (e.g., digital music, poetry, literature, film, pictures, games, etc.) between individuals. In this way, users may share the digital content of a common interest. These exchanges also create new opportunities to sell and trade digital content.

However, the exchange of digital content is typically performed anonymously. That is, the digital content is distributed multiple times from user to user without a means to determine the previous users of the digital content once it has been distributed.

SUMMARY OF THE INVENTION

A digital content file having user history information is received at a first device. The user history information includes an alias name of a previous user of the digital content file. A user may review the user history information of the digital content file for information of the previous user of the digital content.

DETAILED DESCRIPTION OF THE INVENTION

In the following detailed description of embodiments of the invention, reference is made to the accompanying drawings in which like references indicate similar elements, and in which is shown, by way of illustration, specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
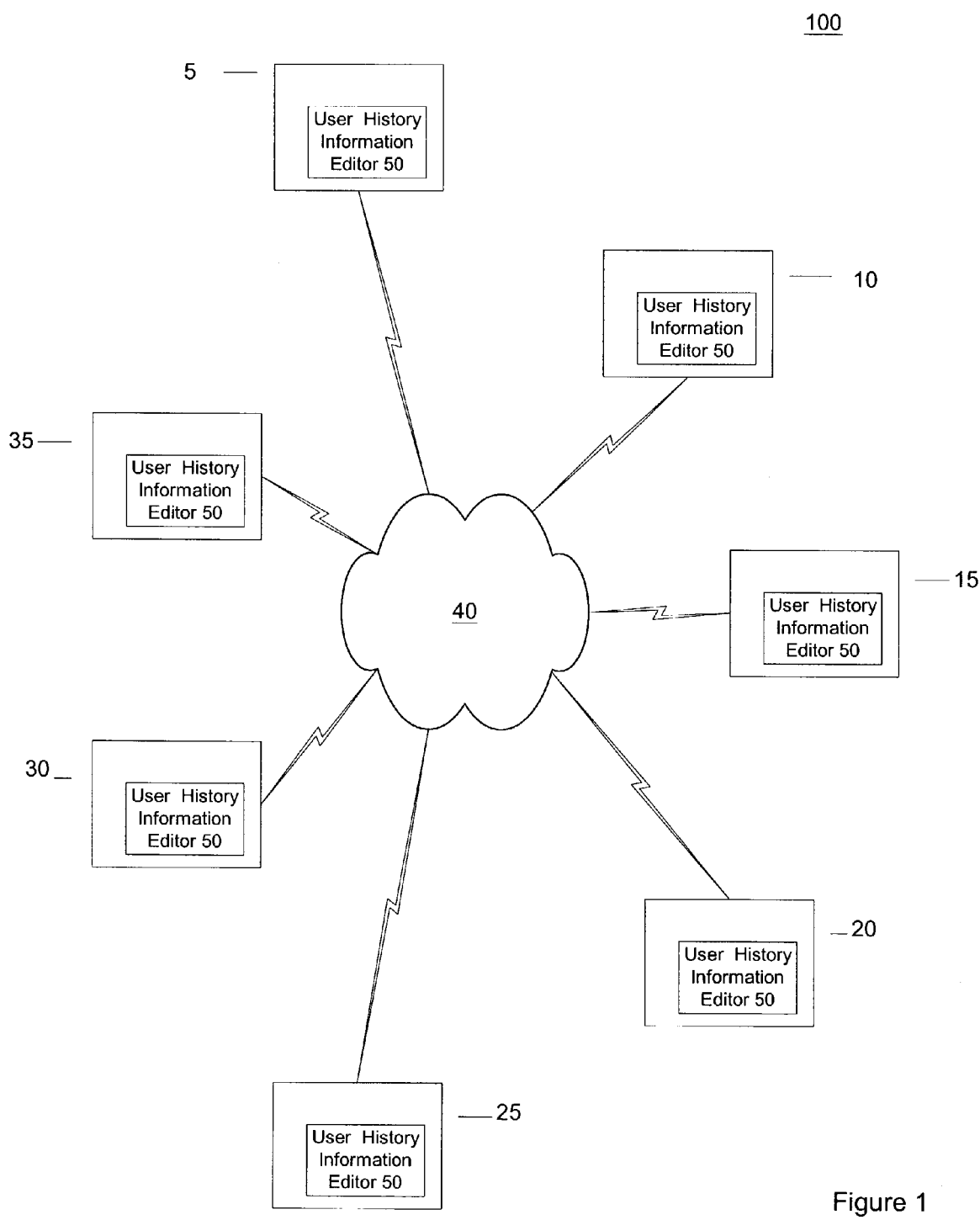
FIG. 1 illustrates one embodiment of a peer-to-peer network environment.

FIG. 1 illustrates one embodiment of a peer-to-peer network environment (100) that is layered on top of a standard network 40, such as a Wide-Area Network (WAN) or a Local-Area Network (LAN). Each device node connected to the network 40 may be logically coupled through the network 40 to any of the other nodes on the network 40 to form the peer-to-peer network environment 100. Each node may correspond to one or more physical devices. As illustrated, the peer-to-peer network environment 100 includes device 5, device 10, device 15, device 20, device 25, device 30 and device 35. Each device is at least capable of performing peer-to-peer communications with the other devices functioning as peers in the network environment 100. Peer-to-peer communications includes the sharing of computer resources and services by direct exchange between peer devices (or indirectly though an intermediate peer device). These resources and services may include the exchange of information, processing cycles, cache storage and disk storage for files, among other examples, although all of the resources and services are not required to be present on each peer device. Therefore, each device 5, 10, 15, 20, 25, 30 and 35 in the network 100 may initiate a peer-to-peer communications session in the network environment 100.

Each device also has the capability of identifying devices it would like to communicate or initiate a relationship with, to discover devices entering and leaving the network environment 100 (discovery process), and to determine what communications protocol is being used in the network environment 100. For example, communication between peer devices may be via a wire and/or wireless protocol, such as TCP/IP, Bluetooth, 802.11x protocols commonly referred to as WiFi (Wireless Fidelity), General Packet Radio Service (GPRS), and WAP (Wireless Application Protocol), used to exchange data across mobile telephone networks, among other communication protocols well known in the art.

The devices 5, 10, 15, 20, 25, 30 and 35 may include mobile devices such as a personal digital assistance (PDA), a mobile phone, a portable computer, a pager and a portable music player (e.g., MP3 player), among other devices. Alternatively, the devices 5, 10, 15, 20, 25, 30 and 35 may include typical non-mobile devices, such as a desktop computer, a home entertainment system, a set-top box and a gaming system, and among other examples. An embodiment of a suitable device is described below in conjunction with FIG. 5.

Each device also includes user history information editor 50 software. The user history information editor 50 software is used to attach, view, exchange and edit user history information attached to digital content. In this way, the digital content may accumulate a history of the users of the digital content, which may be used to add value to the digital content, as will be described.

The user history information may include a user identifier (e.g., an alias name), a user quality rating, a user email address and a user comment. The user identifier may identify the true identity of a user of the digital content or identify an alias name of a user of the digital content. The alias name may or may not be known to other users of devices on the network 100. The user quality rating is a subjective value assigned by a user of the digital content, which indicates a subjective quality of the digital content. The user comment is a message that describes an opinion of the digital content according to the user.

It should be understood that when interacting with strangers, a user might create an alias and use that name as his or her identity when interacting with a particular individual or group. As trust is built between the various parties, a user may elect to reveal more information or may even share their true identity or primary email address. For example, Clark Kent may use the alias "Superman" when interacting with the other devices on the network 100. Unless Clark gives his true identity to the other devices, the other devices will not know that the true identity of "Superman" is Clark Kent.

It should also be understood that the terminology used in this application with respect to exchanging digital content is meant to include a user sharing digital content without consideration from another user. This is, a user may distribute digital content without seeking digital content in return.

Figure 2:
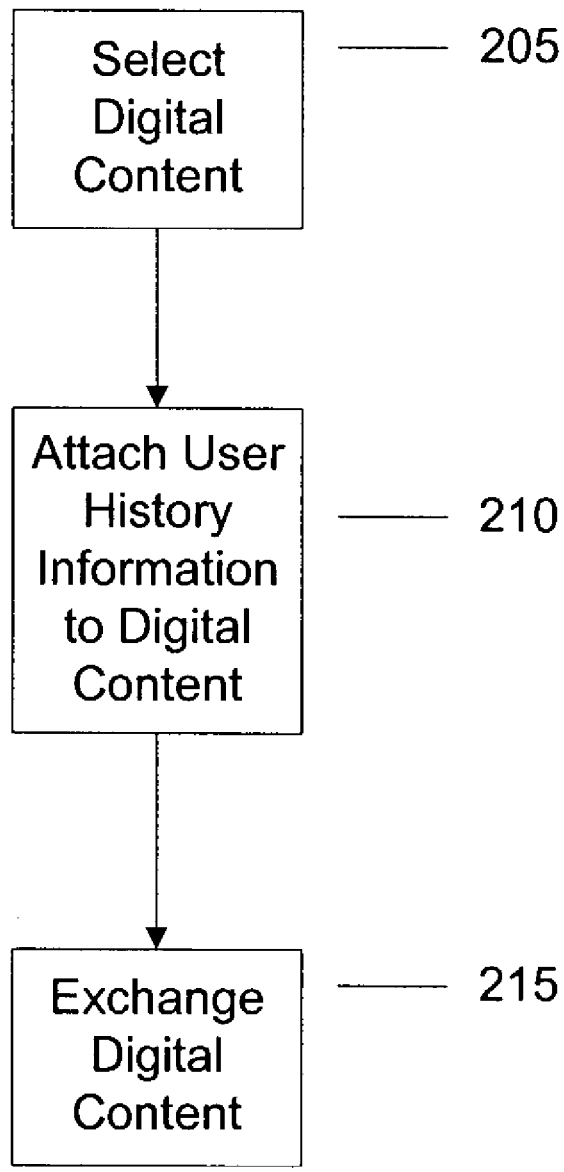
FIG. 2 illustrates one embodiment of a method for attaching user history information to digital content.

FIG. 2 illustrates one embodiment of a method 200 for attaching user history information to digital content. In this embodiment, the method 200 is executed by device 5 to exchange digital content with another device on the network, such as device 10.

At block 205, device 5 selects the digital content. Digital content may include digital music, poetry, literature, a film, a game and a picture, among other examples well known to those of ordinary skill in the art.

At block 210, device 5 attaches user history information to the digital content. For example, the user, Clark Kent, may give a classic jazz music file a rating of "7" and include the user comment "like cool man." Also, instead of using his true identity ("Clark Kent"), Clark uses an alias, "Superman." The attached user history information may be attached to the digital content via an editor. The user history information may be attached to the digital content in the natural format of the digital content or in a new file format, for example. The user history information may be hidden or visible to all or a subset of users. In one embodiment, users may modify their own user history information but not the user history information of other users. In one embodiment, the attached user history information on the digital content may take the form of metadata.

At block 215, device 5 exchanges the digital content with another user on the network 100. For example, the user of device 5 may email the digital content to the user of device 10. The user of device 5 might also store a copy of the digital content on a local file system, which may be accessed by the other devices on network 100 to copy the digital content having the attached user history information (e.g., via a peer-to-peer file sharing architecture).

It should be understood that, upon exchanging the digital content, the device 5 might receive a reward based on activity performed by a subsequent user of the exchanged content. For example, a user may receive a credit towards the purchase of music when a subsequent user of an exchanged music file plays the exchanged music file. A further description of one embodiment of a system for providing rewards is described below in FIG. 4.

Figure 3:
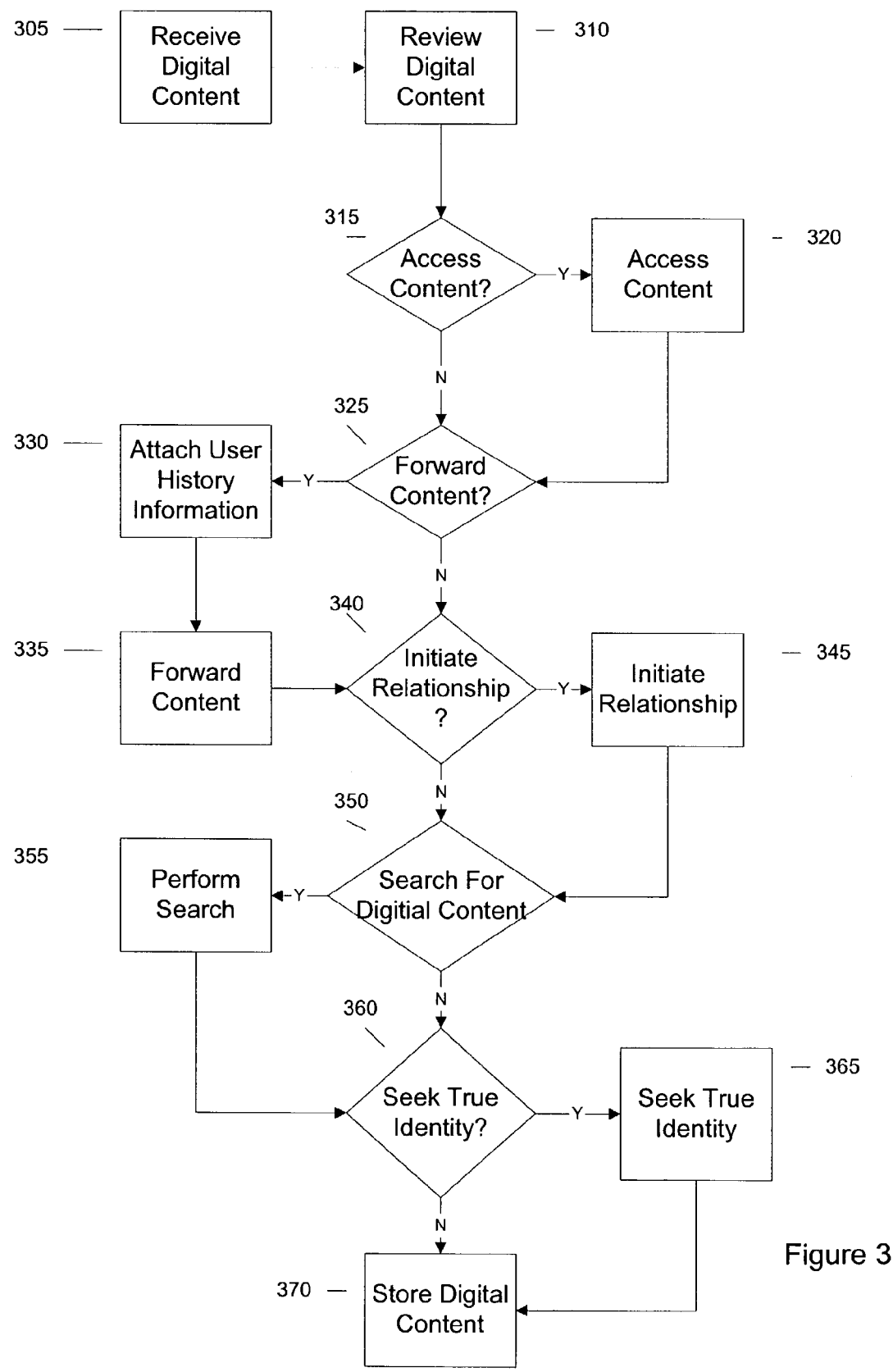
FIG. 3 illustrates one embodiment of a method for a device to review received digital content.

FIG. 3 illustrates one embodiment of a method 300 executed by a device; such as device 10 to review received digital content. At block 305, device 10 receives the digital content having the user history information. For example, device 10 may receive an email from the user of device 5. The email includes the digital content having the user history information. Device 10 might also have selected and copied the digital content from a list of favorite music stored on a file system on device 5 via a peer-to-peer protocol.

At block 310, device 10 reviews the digital content. Referring to the example above, the user of device 10 may view the user history information of each of the previous users of the device including the user quality rating and user comments associated with the alias "Superman."

The user of device 10 may also view an aggregate rating of the received digital content based upon a weighed average rating of the previous users of the digital content. To some, the aggregate content rating is likely to be more accurate or useful than any one user quality rating, which might include personal or subjective feelings.

It should be understood that the content being exchanged might include either an explicit or implicit content rating from the source. For example, an implicit content rating may be associated with digital content based on the amount of time a user accesses the digital content (e.g., a short period of time meaning the user disliked the digital content, a long period of time meaning the user liked the digital content).

As content is passed from device to device, a history is created of the overall content rank, the individual device rankings and the sequence of exchanges. In one embodiment, this history is stored as metadata associated with the actual digital content file. Over time, if a particular user consistently recommends interesting content before other users, then they will emerge as a kind of expert recommender. The recommendations from this alias may be perceived as stronger than those from others and could grow in notoriety. Alternately, a central service can be used to manage the recommendation history, which may be accessible via information (e.g., an Uniform Resource Locator (URL)) stored with the user history information.

At block 315, the device 10 determines if the user wants to access the digital content. For example, the user of device 10 may decide to play a received music file based on the user history information attached with the digital music. If the user decides to access the digital content, control passes to block 320. If the user decides not to access the digital content, control passes to block 325.

At block 320, the device 10 accesses the digital content for the user. For example, if the digital content is a music file, the user of device 10 may listen to the music.

At block 325, the device 10 determines if the user wants to forward the digital content to a user(s) on another device. If the user wants to forward the digital content, control passes to block 330. If the user does not want to forward the digital content, control passes to block 340. At block 330, device 10 attaches the user history information for the user of device 10 onto the digital content. The user of device 10 may also assign a subjective user quality rating value and a user comment to the digital content. For example, user "Peter Parker" inserts a user quality rating of "8" and a user comment of "nice" to be associated with his alias "Spiderman." At block 335, device 10 forwards the digital content to another device on the network 100.

At block 340, the device 10 determines if the user wants to initiate a relationship with a previous user of the content. For example, the user of device 10 may seek to initiate a relationship with another user by initiating a conversation (e.g., initiate an instant messaging session, etc.) to share digital content of common interest (e.g., music, poetry, literature, films, pictures, etc.) etc. If the user of device 10 wants to initiate a relationship, control passes to block 345. If the user of device 10 does not want to initiate a relationship, control passes to block 350.

At block 345, the device 10 initiates a relationship with a previous user of the digital content. For example, the device 10 may initiate an instant messaging session with the user of device 5 based upon the alias and/or the email address of the user of device 10.

At block 350, the device 10 determines if the user wants to search for other digital content associated with a previous user of the received digital content. If the user of device 10 wants to search for additional content, control passes to block 355. If the user of device 10 does not want to search for additional content, control passes to block 360.

At block 355, device 10 performs a search for other digital content associated with a previous user of the received digital content. For example, the user may request a search on the file system of the other devices on the network 100 for digital content. The search may be based on an alias of a previous user and/or user quality rating. The search may be to a list of alias associated to the digital content on each device, a search of the aliases of on individual digital content file, among other examples for organizing and searching well known to those of ordinary skill in the art but not described here so as to not obscure the detailed description.

At block 360, the device 10 determines if the user wants to know the true identity associated with the alias. At times, the true identity of a user may be necessary, for example, to complete a financial exchange associated with an action associated with the digital content. If so, control passes to block 365. If not, control passes to block 370.

In one embodiment, upon performing a specific action, a message is automatically sent to facilitate a reward to a previous user of the digital content as will be further described below in FIG. 4. Such actions may include automatically sending the message upon accessing the digital content (e.g., as in block 320), forwarding digital content (e.g., as in block 335), or initiating a relationship (e.g., as in block 345), among other examples.

At block 365, the device 10 seeks to determine a true identity of a user having an alias identifier. For example, the device 10 may require the true identity of a user to initiate a relationship, to deliver a reward, etc. For example, the user history information attached to digital content may also include an encryption copy of the true identity of the user. Device 10 may use an encryption key (e.g., a public key) to decrypt and reveal the true identity of a user. The device 10 might also access another device to access the true identity of a user if the device 10 has the proper authentication to view the true identity.

At block 370, the device 10 stores the digital content in a data store. For example, the received digital content may be stored in a memory, a database, a shared file system, etc.

It should be understood that a relationship might be initiated by a user (e.g., a user determines whether to initiate an instant messaging session with another user on another device) or automatically by a device (e.g., a device automatically determines a musical piece to play based on a favorite list of another user having a common interest in music).

Although a number of applications for attaching user history information to digital content has been described, it should be understood that the invention is not limited to these examples. For example, FIG. 4 illustrates a process flow for using the user history information attached to the digital content to provide a reward to a previous user of the digital content.

Figure 4:
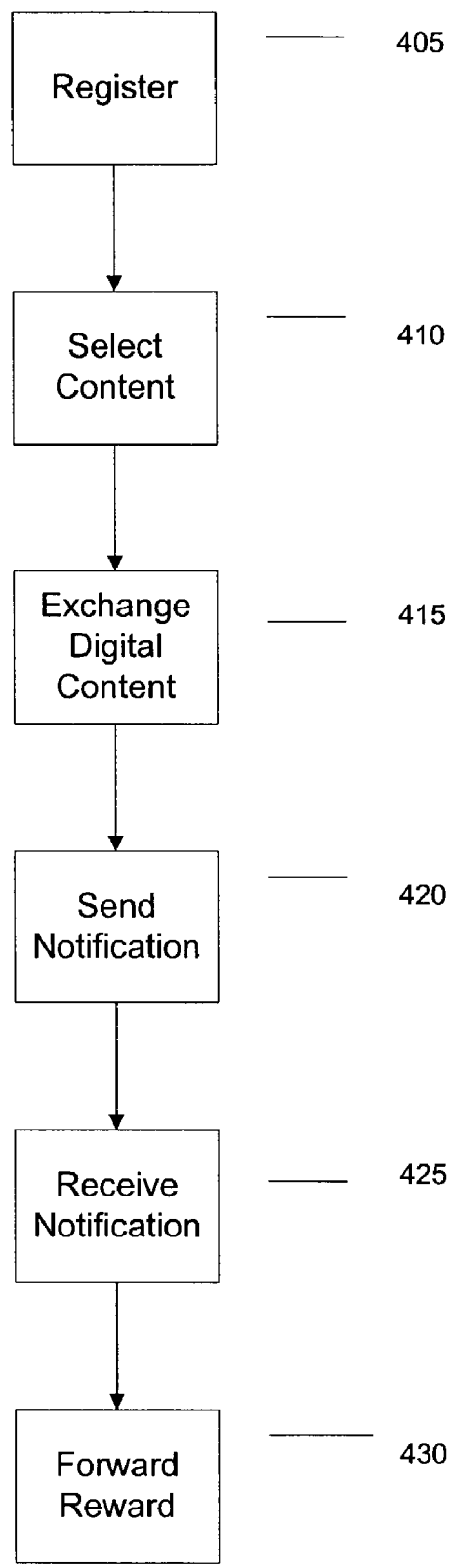
FIG. 4 illustrates one embodiment of a system for providing a reward to a previous user of exchanged digital content.

FIG. 4 illustrates one embodiment of a system for providing a reward to previous user of exchanged digital content. In this embodiment, device 25 offers digital content to a user and provides the user with a reward when, for example, the user forwards a copy of the digital content to another user. Device 25 is also a secured public site used as a trusted directory of aliases and identities. In this way, a user may use as many aliases as desired while still being able to link any financial transactions or commissions to their true identity (e.g., actual name) and account. However, it should be understood that the same device might be used for alternative reasons, such as for direct marketing.

At block 405, a user of device 5 registers with the device 25. For example, the user of device 5 may register on the device 25 by submitting a true identity and the associated alias identity of the user of device 5.

At block 410, the user of device 5 selects digital content from device 25. The digital content may contain user history information of the device 25, such as, an email address of the device 25. In this way, the device 25 may be notified each time a subsequent user accesses the digital content, as will be described. In one embodiment, the user of device 5 purchases the digital content.

At block 415, the user of device 5 exchanges the digital content with a user of device 10 upon attaching user history information of the user of device 5.

At block 420, the device 10 automatically sends a notification message to the device 25 upon accessing the digital content. The notification message includes the identifier of the previous users of the digital content.

At block 425, device 25 receives the notification message.

At block 430, device 25 forwards a reward to each of the previous users of the digital content. In one embodiment, the reward may be a credit for a future purchase of digital content from the device 25, a cash reward, a list of free content each previous user may choose from, etc.

It should be understood that a user might create multiple aliases associated with their true identity. The user history information could then, for example, be shared with third party companies looking to market products and services. A user's true identity would remain hidden, giving the user protection against unwanted invasion or privacy. A user may also delete an alias if they no longer liked the nature of the received marketing. In one embodiment, both the user and the hosting service on device 25 may be paid, for example, by an advertiser for access to the user.

Figure 6:
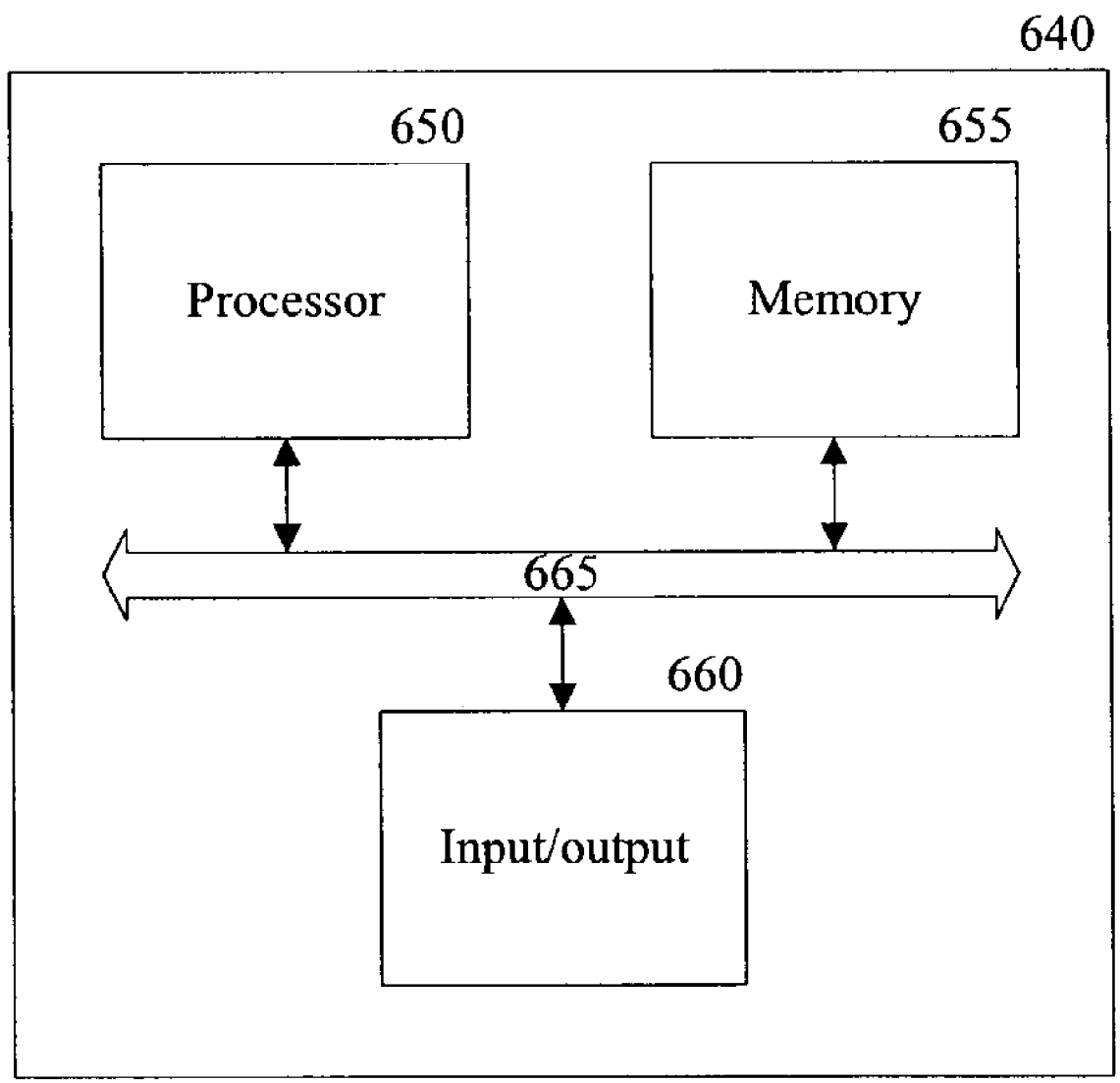
FIG. 6 illustrates a computer system according to one embodiment of the invention.

It will be appreciated that the peer-to-peer network environment 100 illustrated in FIG. 6 does not limit the configuration of peer-to-peer networks in which embodiments of the invention may operate. For example, one of skill will readily appreciate that a server may be coupled to the peer-to-peer network to provide centralized services to the peer devices. Furthermore, one of skill in the art will immediately understand that more than one peer-to-peer network environment may be layered on the same underlying network structure and that each peer device may participate in multiple peer-to-peer network environments simultaneously.

Figure 5:
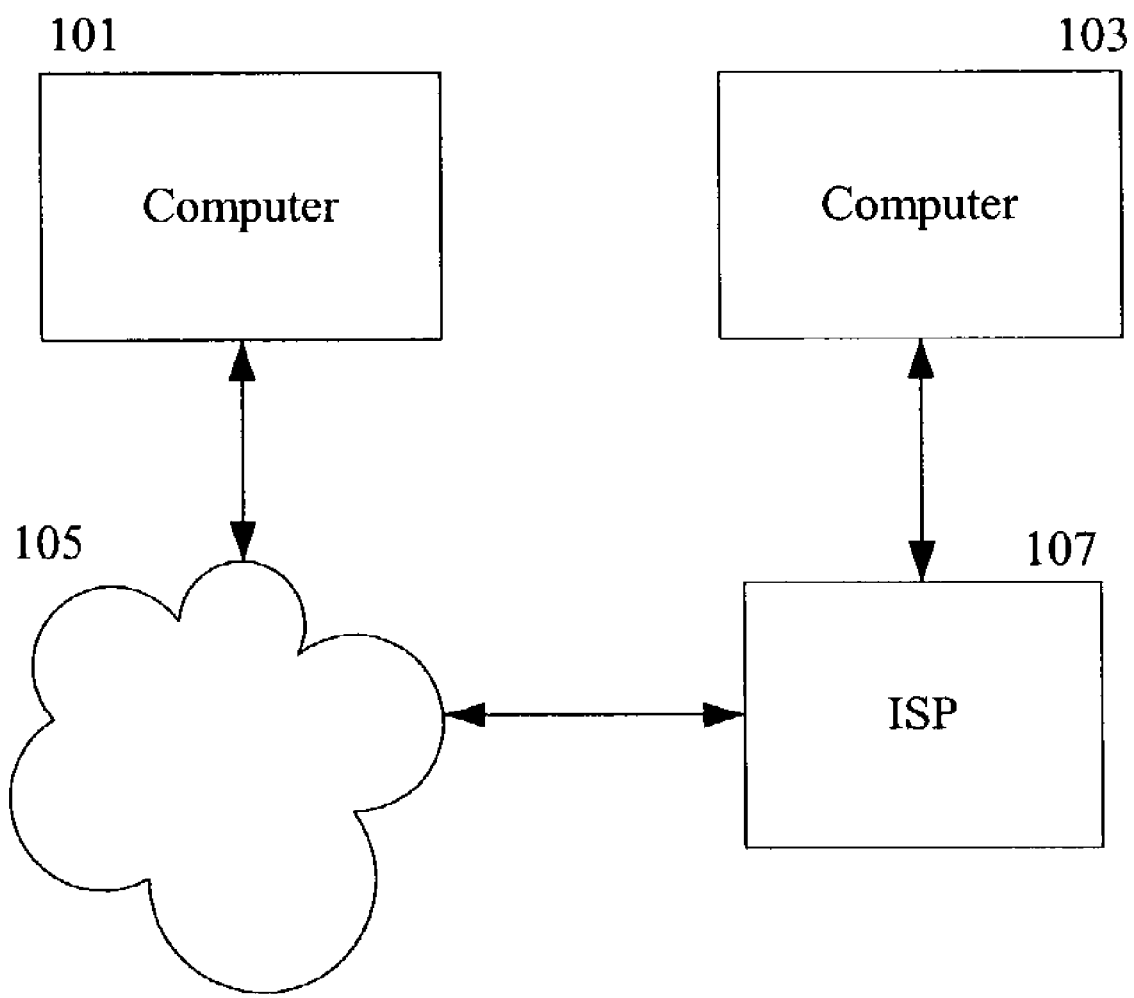
FIG. 5 illustrates a diagram of an environment suitable for practicing the invention.

In one embodiment, as shown in FIG. 5, a computer 101 is part of, or coupled to, a network 105, such as the Internet, to exchange data with another computer 103, as either a client or a server computer. Typically, a computer couples to the Internet through an ISP (Internet Service Provider) 107 and executes a conventional Internet browsing application to exchange data with a server. For example, the user of computer 101 could exchange digital content with the user of computer 103 via the ISP 107 and network 105. Other types of applications allow clients to exchange data through the network 105 without using a server. It is readily apparent that the present invention is not limited to use with the Internet; directly coupled and private networks are also contemplated.

One embodiment of a system suitable for use in the environments of FIGS. 1 and 5 is illustrated in FIG. 6. The system 640 includes a processor 650, a memory 655 and input/output capability 660 coupled to a system bus 665. The memory 655 is configured to store instructions which, when executed by the processor 650, perform the methods described herein. The memory 655 may also store data, such as user history information data. Input/output 660 provides for the delivery and display of the data of digital content having user history information or portions or representations thereof. Input/output 660 may also include components to transmit and receive a digital content to/from one or more devices on the network 100 (e.g., via a network card, a modem, a fax card, among other examples). Input/output 660 also encompasses various types of machine or computer-readable media, including any type of storage device that is accessible by the processor 650. It will also be appreciated that the computer is controlled by operating system software executing in memory 655. Input/output and related media 660 store the machine/computer-executable instructions for the operating system and methods as described as well as the user history information data.

The description of FIGS. 1 and 5 are intended to provide an overview of computer hardware and various operating environments suitable for implementing the invention, but is not intended to limit the applicable environments. It will be appreciated that the system 640 is one example of many possible devices that have different architectures. A typical device will usually include at least a processor, a memory and a bus coupling the memory to the processor. Such a configuration encompasses personal computer systems, network computers, television-based systems, such as Web TVs or set-top boxes, handheld devices, such as cell phones and personal digital assistants, and similar devices. One of skill in the art will immediately appreciate that the invention can be practiced with other system configurations, including multi-processor systems, minicomputers, mainframe computers, and the like. The invention can also be practiced in distributed computing environments where tasks are performed by remote processing devices that are linked through a communications network.

It will be appreciated that more or fewer processes may be incorporated into the methods illustrated in FIGS. 2, 3 and 4 without departing from the scope of the invention, and that no particular order is implied by the arrangement of blocks shown and described herein. Describing the methods by reference to a flow diagram enables one of ordinary skill in the art to develop such programs including such instructions to carry out the methods on suitably configured computers (the processor of the computer executing the instructions from computer-readable media, including memory). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or produce a result.

Figure 7:
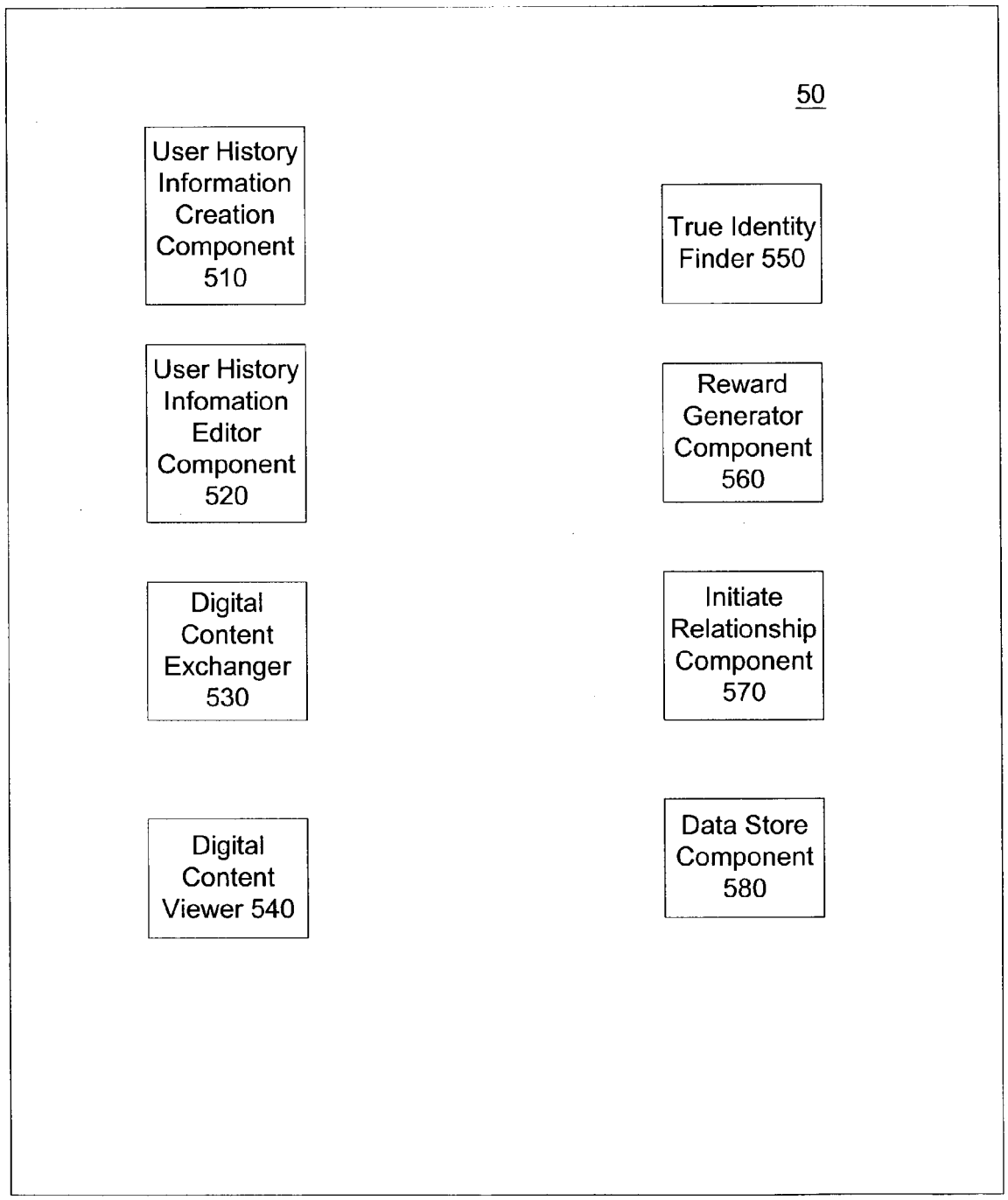
FIG. 7 illustrates one embodiment of components of the user history information editor.

FIG. 7 illustrates one embodiment of components of the user history information editor 50. The user history information editor 50 includes a user history information creation component 510, a user history information editor component 520, a digital content exchanger component 530, a digital content viewer component 540, a true identity finder component 550, a reward generator component 560, an initiate relationship component 570 and a data store component 580. Components of the user history information editor to be performed by a processor executing the user history information editor name methods, as described above in FIGS. 2, 3 and 4.

The user history information creation component 510 includes software instructions to attach user history information to digital content as described above in conjunction with FIG. 2. The user history information editor component 520 includes software instructions to create, modify and/or delete user history information to be attached onto the digital content, as described above in conjunction with FIG. 2. The digital content exchanger component 530 includes software instructions to exchange digital content with another device, as described above in conjunction with FIG. 2. The digital content viewer 540 includes software instructions to view the user history information attached to the digital content, as described above in conjunction with FIG. 3. The true identity finder component 550 includes software instructions to discover the true identity of a user having an alias attached with the digital content, as described above in conjunction with FIG. 3. The reward generator component 560 includes software instructions to facilitate the generation of a reward to a previous user of the digital content, as described above in conjunction with FIG. 4. The initiate relationship component 570 includes software instructions to initiate a relationship with a user on another device (e.g., initiate an instant messaging session), as described above in conjunction with FIG. 3. The data store component 580 includes software instructions to store and receive the user history information in a memory in conjunction with FIG. 3.

The exchange of digital content having user history information has been described. Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the described invention.

While the invention is not limited to any particular implementation, for the sake of clarity, simplified process flows of example implementations for using digital content having user history information has been described. For example, those of ordinary skill within the art will appreciate that the use of an alias name to attach to the digital content gives the user the ability to protect and manage their Internet identities in new and more flexible ways. Therefore, it is manifestly intended that this invention be limited only by the following claims and equivalents thereof.

What is claimed is:

1. A computerized method, comprising:
    sending, by a data processing system, a request for digital content;
    receiving a digital content file with initial user history information attached to the digital content file, the initial user history information identifying a source of the digital content file;
    generating subsequent user history information comprising an alias name of an initial user, an encrypted version of a true identity of the initial user, and the initial user history information;
    sending the digital content file with the subsequent history information attached to the digital content file to a subsequent device; and
    receiving a reward based on sending the digital content file to the subsequent device, wherein the reward is received in response to the subsequent device sending a notification to the source of the digital content file, the notification indicating that the subsequent device received the digital content file from the initial device.

2. The computerized method of claim 1, further comprising:
    sending, by the data processing system, a registration request comprising the alias name of the initial user and the true identity of the initial user before sending the request for digital content.

3. The computerized method of claim 1, wherein the reward enables the initial user to purchase other digital content at a discount.

4. The computerized method of claim 1, wherein the notification includes the alias name of the initial user.

5. The computerized method of claim 4, wherein the notification also includes the encrypted version of the true identity of the initial user.

6. A computerized method comprising:
    receiving, by a computer from an initial device, a request for digital content, the initial device corresponding to a true identity of an initial user and an alias name of the initial user;
    attaching initial user history information to a digital content file, the initial user history information identifying a source of the digital content;
    sending the digital content file to the initial device with the attached initial user history information;
    receiving a notification from a subsequent device, the notification indicating that the subsequent device has acquired the digital content file with subsequent user history information attached to the digital content file, wherein the subsequent user history information includes
        the alias name of the first user,
        an encrypted version of the true identity of the first user, and
        the initial user history information identifying the digital content provider and used by the subsequent device to provide the notification; and
    forwarding, in response to the notification, a reward to the initial user based on the acquisition of the digital content file by the subsequent device from the initial device.

7. The computerized method of claim 6, wherein the initial user history information and the subsequent user history information attached to the digital content file are metadata.

8. The computerized method of claim 6, wherein the subsequent user history information includes a user quality rating to rate a quality of the digital content file, the user quality rating being associated with the alias name.

9. The computerized method of claim 6, wherein the subsequent user history information includes a user comment to comment on a quality of the digital content file, the user comment being associated with the alias name.

10. A machine-readable storage medium storing executable instructions to cause a device to perform a method comprising:
    sending, by a data processing system, a request for digital content;
    receiving a digital content file with initial user history information attached to the digital content file, the initial user history information identifying a source of the digital content file;
    generating subsequent user history information comprising an alias name of an initial user, an encrypted version of a true identity of the initial user, and the initial user history information;
    sending the digital content file with the subsequent history information attached to the digital content file to a subsequent device; and
    receiving a reward based on sending the digital content file to the subsequent device, wherein the reward is received in response to the subsequent device sending a notification to the source of the digital content file, the notification indicating that the subsequent device received the digital content file from the initial device.

11. The machine-readable storage medium of claim 10, further comprising:
    sending, by the data processing system, a registration request comprising the alias name of the initial user and the true identity of the initial user before sending the request for digital content.

12. The machine-readable storage medium of claim 10, wherein the reward enables the initial user to purchase other digital content at a discount.

13. The machine-readable storage medium of claim 10, wherein the notification includes the alias name of the initial user.

14. The machine-readable storage medium of claim 13, wherein the notification also includes the encrypted version of the true identity of the initial user.

15. A machine-readable storage medium storing executable instructions to cause a processor to perform a method comprising:
    receiving, from an initial device, a request for digital content, the initial device corresponding to a true identity of an initial user and an alias name of the initial user;
    attaching initial user history information to a digital content file, the initial user history information identifying a source of the digital content;
    sending the digital content file to the initial device with the attached initial user history information;
    receiving a notification from a subsequent device, the notification indicating that the subsequent device has acquired the digital content file with subsequent user history information attached to the digital content file, wherein the subsequent user history information includes
        the alias name of the first user,
        an encrypted version of the true identity of the first user, and
        the initial user history information identifying the digital content provider and used by the subsequent device to provide the notification; and
    forwarding, in response to the notification, a reward to the initial user based on the acquisition of the digital content file by the subsequent device from the initial device.

16. The machine-readable storage medium of claim 15, wherein the initial user history information and the subsequent user history information attached to the digital content file are metadata.

17. The machine-readable storage medium of claim 15, wherein the subsequent user history information includes a user quality rating to rate a quality of the digital content file, the user quality rating being associated with the alias name.

18. The machine-readable storage medium of claim 15, wherein the subsequent user history information includes a user comment to comment on a quality of the digital content file, the user comment being associated with the alias name.

19. A device comprising:
a processor coupled to a memory through a bus; and
a process executed by the processor from the memory to cause the processor to send a request for digital content, to receive a digital content file having with initial user history information attached to the digital content file, the initial user history information identifying a source of the digital content file, to generate subsequent user history information comprising an alias name of an initial user, an encrypted version of a true identity of the initial user, and the initial user history information;
to send the digital content file with the subsequent history information attached to the digital content file to a subsequent device; and
to receive a reward based on sending the digital content file to the subsequent device, wherein the reward is received in response to the subsequent device sending a notification to the source of the digital content file, the notification indicating that the subsequent device received the digital content file from the initial device.

20. The device of claim 19, wherein the process further causes the processor to send a registration request comprising the alias name of the initial user and the true identity of the initial user before sending the request for digital content.

21. The device of claim 19, wherein the reward enables the initial user to purchase other digital content at a discount.

22. The device of claim 19, wherein the notification includes the alias name of the initial user.

23. The device of claim 22, wherein the notification also includes the encrypted version of the true identity of the initial user.

24. A data processing system comprising:
a processor coupled to a memory through a bus; and
a process executed by the processor from the memory to cause the processor
to receive, from an initial device, a request for digital content, the initial device corresponding to a true identity of an initial user and an alias name of the initial user,
to attach initial user history information to a digital content file, the initial user history information identifying a source of the digital content
to send the digital content file to the initial device with the attached initial user history information;
to receive a notification from a subsequent device, the notification indicating that the subsequent device has acquired the digital content file with subsequent user history information attached to the digital content file,
wherein the subsequent user history information includes
the alias name of the first user,
an encrypted version of the true identity of the first user, and
the initial user history information identifying the digital content provider and used by the subsequent device to provide the notification; and
to forward, in response to the notification, a reward to the initial user based on the acquisition of the digital content file by the subsequent device from the initial device.

25. The device of claim 24, wherein the initial user history information and the subsequent user history information attached to the digital content file are metadata.

26. The device of claim 24, wherein the process further causes the processor, when the subsequent user history information includes a user quality rating, to rate a quality of the digital content file, the user quality rating being associated with the alias name.

27. The device of claim 24, wherein the process further causes the processor, when the subsequent user history information includes a user comment, to comment on a quality of the digital content file, the user comment being associated with the alias name.

28. An apparatus comprising:
a means for sending, by a hardware device, a request for digital content; a means for receiving a digital content file with initial user history information attached to the digital content file, the initial user history information identifying a source of the digital content file;
means for generating subsequent user history information comprising an alias name of an initial user, an encrypted version of a true identity of the initial user, and the initial user history information;
means for sending the digital content file with the subsequent history information attached to the digital content file to a subsequent device; and
means for receiving a reward based on sending the digital content file to the subsequent device, wherein the reward is received in response to the subsequent device sending a notification to the source of the digital content file, the notification indicating that the subsequent device received the digital content file from the initial device.

29. The apparatus of claim 28, further comprising:
a means for sending, by the data processing system, a registration request comprising the alias name of the initial user and the true identity of the initial user before sending the request for digital content.

30. The apparatus of claim 28, further comprising:
a means for accessing the digital content file.

31. An apparatus comprising:
a means for receiving, by a computer from an initial device, a request for digital content, the initial device corresponding to a true identity of an initial user and an alias name of the initial user;
a means for attaching initial user history information to a digital content file, the initial user history information identifying a source of the digital content;
a means for sending the digital content file to the initial device with the attached initial user history information;
a means for receiving a notification from a subsequent device, the notification indicating that the subsequent device has acquired the digital content file with subsequent user history information attached to the digital content file,
wherein the subsequent user history information includes
the alias name of the first user,
an encrypted version of the true identity of the first user, and the initial user history information identifying the digital content provider and used by the subsequent device to provide the notification; and a means for forwarding, in response to the notification, a reward to the initial user based on the acquisition of the digital content file by the subsequent device from the initial device.

32. The apparatus of claim 31, wherein the initial user history information and the subsequent user history information attached to the digital content file are metadata.

33. The apparatus of claim 31, wherein the subsequent user history information to include an email address.

* * * * *